US006013358A

United States Patent [19]

Winnett et al.

[11] Patent Number: 6,013,358

[45] Date of Patent: Jan. 11, 2000

[54] TRANSIENT VOLTAGE PROTECTION DEVICE WITH CERAMIC SUBSTRATE

[75] Inventors: Joan L. Winnett, Chesterfield; Stephen J. Whitney, Manchester; Edward G. Glass, University City; Vernon Spaunhorst, Washington; Farid Ghaderi, Wildwood, all of Mo.

[73] Assignee: Cooper Industries, Inc., Houston, Tex.

[21] Appl. No.: 08/972,574

[22] Filed: Nov. 18, 1997

[51] Int. Cl.[7] .......... B32B 9/00

[52] U.S. Cl. .......... 428/210; 428/218; 428/901; 174/258

[58] Field of Search .......... 428/210, 218, 428/901; 174/258

[56] References Cited

U.S. PATENT DOCUMENTS

| | | | |
|---|---|---|---|
| 3,676,742 | 7/1972 | Russell et al. | 317/33 R |
| 3,685,026 | 8/1972 | Wakabayashi et al. | 340/173 R |
| 3,685,028 | 8/1972 | Wakabayashi et al. | 340/173 R |
| 4,586,105 | 4/1986 | Lippmann et al. | 361/117 |
| 4,724,182 | 2/1988 | Kato et al. | 428/210 |
| 4,729,752 | 3/1988 | Dawson, Jr. et al. | 339/147 R |
| 4,806,334 | 2/1989 | Fujinaka et al. | 428/21 D |
| 4,977,357 | 12/1990 | Shrier | 338/21 |
| 5,099,380 | 3/1992 | Childers et al. | 361/56 |
| 5,142,263 | 8/1992 | Childers et al. | 338/21 |
| 5,181,859 | 1/1993 | Foreman et al. | 439/225 |
| 5,183,698 | 2/1993 | Stephenson et al. | 428/209 |
| 5,189,387 | 2/1993 | Childers et al. | 338/20 |
| 5,194,010 | 3/1993 | Dambach et al. | 439/79 |
| 5,197,891 | 3/1993 | Tanigawa et al. | 439/55 |
| 5,246,388 | 9/1993 | Collins et al. | 439/620 |
| 5,260,848 | 11/1993 | Childers | 361/127 |
| 5,262,754 | 11/1993 | Collins | 338/21 |
| 5,278,535 | 1/1994 | Xu et al. | 338/20 |
| 5,290,191 | 3/1994 | Foreman et al. | 438/228 |
| 5,294,374 | 3/1994 | Martinez et al. | 252/518 |
| 5,336,547 | 8/1994 | Kawakita et al. | 428/209 |
| 5,340,641 | 8/1994 | Xu | 428/209 |
| 5,342,220 | 8/1994 | Kodama | 439/607 |
| 5,376,435 | 12/1994 | Morozumi | 428/210 |
| 5,393,597 | 2/1995 | Childers et al. | 428/242 |
| 5,440,802 | 8/1995 | Whitney et al. | 29/623 |
| 5,477,407 | 12/1995 | Kobayashi et al | 361/56 |
| 5,700,548 | 12/1997 | Warnier et al. | 428/210 |
| 5,709,927 | 1/1998 | Miyase et al. | 428/210 |
| 5,726,621 | 3/1998 | Whitney et al. | 337/297 |

OTHER PUBLICATIONS

International Search Report re PCT/US97/21117 Date of mailing of International Search Report: Mar. 4, 1998.

"ChipGuard[TM]", Mourns, Inc. 1996.

"Two Electrical Switching Phenomena in a Silver–Filled Epoxy", NASA Tech, Briefs, Jun. 1996.

*Primary Examiner*—Timothy Speer
*Assistant Examiner*—Cathy F. Lam
*Attorney, Agent, or Firm*—Armstrong Teasdale LLP

[57] ABSTRACT

A transient voltage protection device is described wherein a gap between a ground conductor and another conductor is formed using a diamond dicing saw. Substrate material selection includes specific ceramic materials having a density of less than 3.8 gm/cm$^3$ designed to optimize performance and manufacturability. An overlay layer can be provided to minimize burring of the conductors during formation of the gap.

7 Claims, 6 Drawing Sheets

TRANSIENT VOLTAGE PROTECTION DEVICE WITH CERAMIC SUBSTRATE

BACKGROUND

Applicants' invention relates generally to devices for protecting electrical equipment and to methods of making such devices, which devices are commonly referred to as "surge protection" or "transient voltage suppression" devices. Transient voltage protection devices were developed in response to the need to protect the ever-expanding number of electronic devices upon which today's technological society depends from high voltages. Electrical transient voltages can be created by, for example, electrostatic discharge or transients propagated by human contact. Examples of electrical equipment which typically employ transient voltage protection equipment include, telecommunications systems, computer systems and control systems.

Recent developments in transient voltage protection technology have centered around usage of a material having a variable impedance which interconnects, for example, a signal conductor with a ground conductor. The variable impedance material exhibits a relatively high resistance (referred to herein as the "off-state") when the voltage and/or current passing through the signal conductor is within a specified range, during which time the signal conductor is ungrounded.

If, however, the signal conductor experiences a voltage which exceeds the threshold for which the variable impedance material (and the transient voltage protection device generally) has been designed, then the electrical characteristics of the variable impedance material will change such that the material exhibits a relatively low impedance (referred to herein as the "on-state"). At this time, the pulse or transient voltage experienced by the signal conductor will be shunted to the ground conductor, and the voltage associated with the pulse will be clamped at a relatively low value for the duration of the pulse. In this way, the circuitry associated with the signal conductor is protected.

The variable impedance material will recover after the voltage or current pulse has passed and return to its high impedance state. Thus, the signal conductor and associated circuitry can continue normal operation shortly after the pulse has ended.

Different types of variable impedance materials, also sometimes referred to as "overstress responsive compositions", are known in the art. These materials can, for example, be fabricated as a mixture of conductive and/or semiconductive particles suspended as a matrix within a binding material, which can, for example, be an insulative resin. Numerous examples of these types of materials can be found in the patent literature including U.S. Pat. Nos. 5,393,596 and 5,260,848 to Childers, U.S. Pat. Nos. 4,977,357 and 5,068,634 to Shrier and U.S. Pat. No. 5,294,374 to Martinez, the disclosures of which are incorporated here by reference. U.S. Pat. Nos. 3,685,026 and 3,685,028 also disclose compositions including conductive particles dispersed in a resin.

U.S. Pat. No. 5,278,535 to Xu et al. describes an electrical overstress pulse protection device which employs a variable impedance material. Specifically, Xu et al. provide a thin flexible laminate for overlay application on the pins of a connector. The laminate includes an electrically insulating substrate, a conductive lamina of apertured pin receiving pads, a separate ground strip adjacent the pads, and an electrically insulating cover. An electrical overstress pulse responsive composite material is positioned such that it bridges the pads and the ground strip.

This patent to Xu et al., however, uses conventional semiconductor fabrication techniques to create the pulse protection device including forming the substrate from a conventional resin material, e.g., of the type typically used for substrates of printed circuit boards. Similarly, Xu et al. describe forming the conductive elements using etching techniques, which are also well known in the semiconductor fabrication. While these techniques may be appropriate when working with thin film metal conductors, Applicants have determined that other techniques and materials are more desirable when manufacturing signal and ground conductive elements having a greater thickness, e.g., on the order of 0.5–1.0 mils, or more.

SUMMARY

When forming a gap between a signal conductor and a ground conductor that is to be filled with a variable impedance material, Applicants have discovered that repeatable precision of the gap dimensions are important to producing a commercially desirable product. The precision of the gap dimensions are significant because the electrical characteristics of the device, e.g., the trigger voltage, clamp voltage and current density, are, in part, determined by the size and shape of the gap.

Accordingly, it would be desirable to develop new techniques for making transient voltage protection devices wherein the gap between a signal conductor and a ground conductor is formed with a high degree of precision, which precision is repeatable in a manufacturing environment and yet techniques are not so expensive that the resulting transient voltage protection devices cannot compete on a cost basis in the marketplace. At the same time, it would be desirable to optimize the materials used to make such devices to achieve these same objectives.

According to an exemplary embodiment of the present invention, a method for fabricating a transient voltage protection device including, for example, a ground conductor and at least one other conductor comprises the steps of: providing a substrate;

forming a conductive layer on the substrate; and dicing the conductive layer on the substrate to create a gap which separates the conductive layer into at least the ground conductor and the at least one other conductor. The substrate can be formed from a ceramic material or non-ceramic materials such as FR-4. If a ceramic material is used for the substrate, then it is preferable that such a ceramic material have a density of less than about 3.8 gms/cm$^3$. For example, forsterite and calcium borosilicate are two such ceramic materials. Dicing to create the gap can be accomplished, for example, using a diamond dicing saw having, for example, diamond particles of preferably no more than 5 microns in size.

According to another exemplary embodiment of the present invention, a device comprises a ceramic substrate having a density of less than about 3.8 gms/cm, a ground conductor and at least one other conductor formed on the ceramic substrate such that they are substantially co-planar and are separated from one another by a gap; and a variable impedance material disposed within the gap and in contact with both the ground conductor and the at least one other conductor. The ceramic substrate will preferably have a bulk density of less than 3.5 gms/cm$^3$ and optimally a density of less than 3.0 gms/cm$^3$. In particular, Applicants have identified forsterite ($2MgSiO_2$) having a bulk density of 2.8 gms/cm$^3$ and calcium borosilicate, having a bulk density of 2.5 gms/cm$^3$ as materials which are well suited for substrates according to the present invention. By selecting ceramic or glass-based materials in accordance with the present invention, the gap between the ground and signal conductor can be precisely formed with the desired dimensions and good edge acuity.

BRIEF DESCRIPTION OF THE DRAWINGS

The features and advantages of Applicants' invention will be understood by reading this description in conjunction with the drawings, in which.

DETAILED DESCRIPTION

Figure 1A:
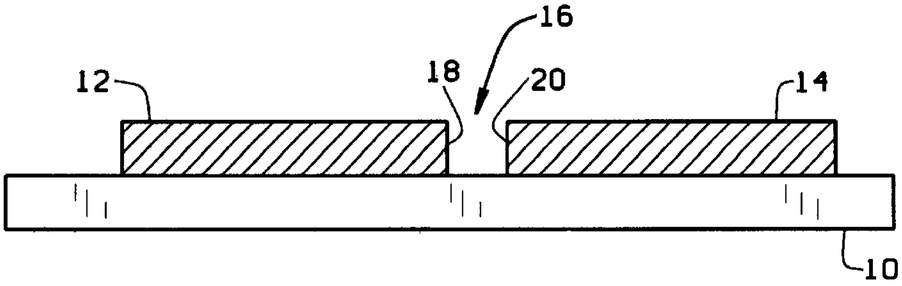
FIG. 1A illustrates a portion of a discrete transient voltage protection element.
Figure 1B:
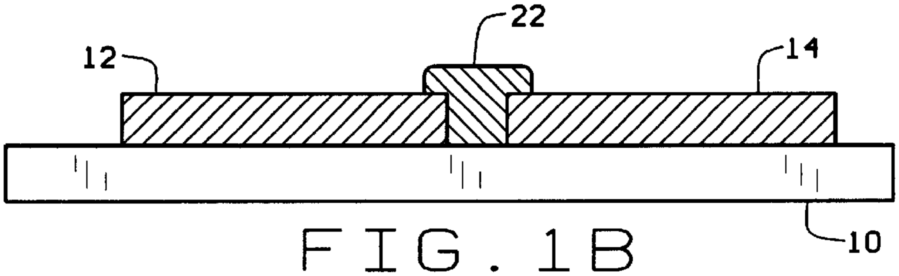
FIG. 1B illustrates the discrete transient voltage protection element of FIG. 1A including the variable impedance material.

An exemplary embodiment of the present invention is depicted in FIGS. 1A and 1B, which Figures are used to explain the terminology used herein. FIG. 1 shows a discrete transient voltage protection element, i.e., a transient voltage protection element which can be used as part of a circuit board, however other applications of the present invention are contemplated, e.g., using transient voltage protection devices according to the present invention as part of a connector. The discrete transient voltage protection element includes a substrate 10 on which two conductors 12 and 14 are formed. In this example, conductor 12 is the ground conductor, while conductor 14 is a signal or power carrying conductor. A gap 16 is formed between conductors 12 and 14. Note that although FIG. 1A illustrates the gap as extending to the surface of substrate 10, preferred embodiments of the present invention include extending the gap into the substrate. As described above, the electrical characteristics of the transient voltage protection element will depend, in part, on the precision with which gap 16 is formed. Thus, precision of the depth, width and uniformity of edges 18 and 20 (referred to herein as "edge acuity") associated with gap 16 is carefully controlled by way of the techniques described below.

FIG. 1B illustrates the discrete transient voltage protection element of FIG. 1A, wherein a variable impedance material 22 fills the gap 16. According to the present invention, any known variable impedance material may be used, including those described in the above-incorporated by reference patents, as well as those fabricated from dielectric polymers, glass, ceramic or composites thereof. These materials may, for example, include or be mixed with conductive and/or semiconductive particles in order to provide the desired electrical characteristics. Although any variable impedance material can be used, a currently preferred variable impedance material is that manufactured by SurgX Corporation and identified by SurgX as Formulation #F1-6B.

Having briefly described the structure of an exemplary discrete transient voltage protection element according to the present invention, a method for manufacturing transient voltage protection devices will now be described with respect to FIGS. 2A–2D. Many such devices can be fabricated on a single wafer. The process begins by selecting a suitable material for the substrate wafer 30. Although illustrated as a rectangle for simplicity in FIG. 2A, those skilled in the art will appreciate that the shape of the wafer provided by a wafer manufacturer may vary and can, for example, be circular.

Since Applicants have discovered that forming the gap by dicing is a preferred technique to form the desired precisely dimensioned gap between conductors, a ceramic or glass-based material is preferred for substrate 30. Although the present invention contemplates any and all ceramic materials and glass-based materials, it has been found that certain ceramics and glass-based materials are optimal from a manufacturing point of view. In particular, ceramic and glass-based materials should be selected which have a sufficiently low density that a diamond dicing saw can create the gap (1) with sufficient edge acuity and (2) without wearing out the saw so rapidly as to be economically unfeasible.

Based on their experimentation, Applicants have discovered that preferable ceramics and/or glass-based materials will have a density of less than 3.8 gms/cm$^3$, preferably less than 3.5 gms/cm$^3$ and optimally a density of less than 3.0 gms/cm$^3$. In particular, Applicants have identified forsterite ($2MgSiO_2$) having a bulk density of 2.8 gms/cm$^3$ and calcium borosilicate, having a bulk density of 2.5 gms/cm$^3$ as materials which are well suited for substrates according to the present invention. However, those skilled in the art will appreciate that any ceramic, e.g., a material within the ternary system $MgO—Al_2O_3—SiO_2$ system or other materials having similar properties, or glass composite having a sufficiently low bulk density and being otherwise amenable to dicing can be used as a substrate in accordance with the present invention.

Figure 2A:
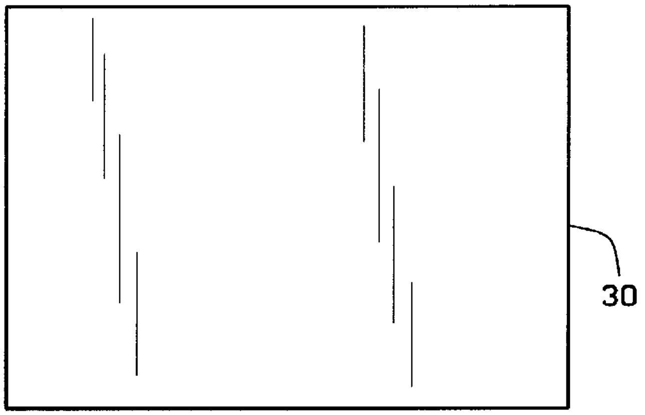
FIGS. 2A–2D depict discrete transient voltage protection elements at various stages of manufacture used to illustrate methods of making such elements according to the present invention.
Figure 2B:
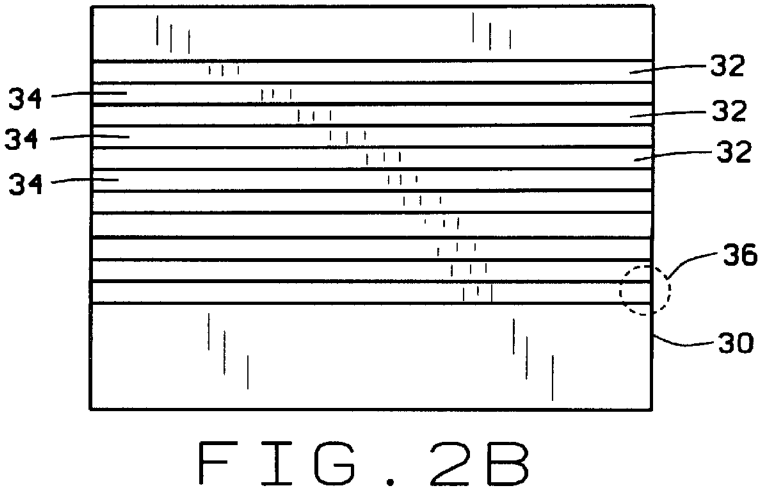

Having selected a suitable substrate 30, the next step, the result of which is illustrated in FIG. 2B, is to pattern the substrate with metallization. In this exemplary embodiment, wherein discrete transient voltage protection devices are being manufactured, the metallization can take the form of elongated lines 32 spaced apart on substrate 30 by areas 34. According to one exemplary embodiment of the present invention, the metallization lines 32 can be formed by silk screening silver palladium onto the substrate 30. Of course those skilled in the art will appreciate that other conductive materials could be used including, for example, copper, gold, nickel, etc.

The width and thickness of the lines 32 can be chosen based on the capabilities desired for the discrete transient voltage protection elements to be created. According to one exemplary embodiment, Applicants have found that a width of about 0.040 inches and a thickness of between 0.5–1.0 mils, provide good performance, however those skilled in the art will appreciate that these values are purely for illustration herein.

Once the metallization has been formed on the substrate wafer 30, then the dicing operations are performed to both form the gaps between the conductors and singulate the substrate wafer 30 into its individual discrete transient voltage protection devices. As mentioned above, Applicants have selected dicing over other techniques which could be used to form the gap between the conductors, e.g., cutting the gap with a laser, for its precision with respect to gap width, depth and edge acuity. Details of diamond dicing techniques which can be used to cut the gaps and singulate the wafer substrate 30 are provided below.

Figure 2C:
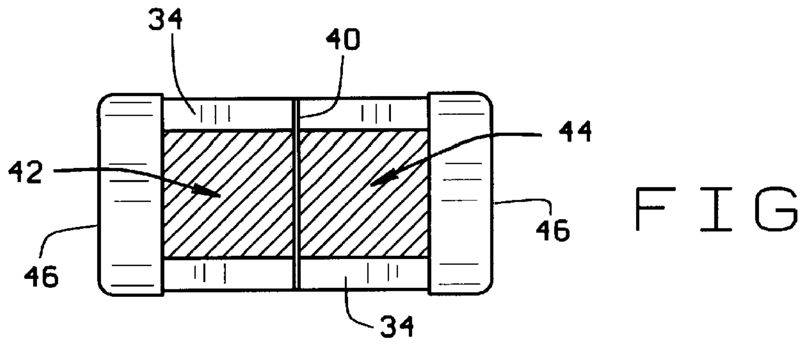

In order to illustrate the diced gap formed between the two conductors, a single discrete device cut from portion 36 of wafer substrate 30 is blown-up as FIG. 2C. This device was cut from wafer substrate 30 by dicing horizontally across the wafer substrate 30 along the areas 34 and vertically across metallization 32. By dicing a gap 40 partially through the wafer substrate 30 and completely through metallization 32, two separate conductors 42 and 44 are formed, one of which can be grounded when attached to a printed circuit board (not shown).

The gap 40 can be diced so as to have any desired width, for example, between 0.5 and 3.0 mils, preferably between 0.8 and 1.1 mils and most preferably about 1 mil. Those skilled in the art will appreciate that other gap widths may be desired, for example the gap width can be increased to increase the clamp voltage or simply to render manufacturing less complex, and that such variations are within the scope of the present invention. The device can then be terminated by capping each end with a conductive material 46.

Figure 2D:
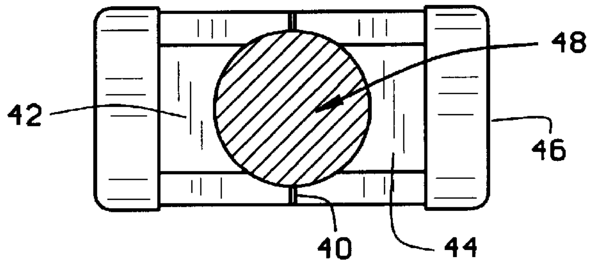

The gap is then filled with a variable impedance material 48 as illustrated in FIG. 2D. As mentioned above, any known variable impedance material can be used, however the currently preferred material is available from SurgX Corporation and is identified as their formulation #F1-6B. In the exemplary embodiment illustrated in FIG. 2D, a circular portion of the variable impedance material 48 can be applied to bridge the gap 40 and have an approximately circular footprint thereon of approximately 0.050 inches. According to one exemplary embodiment, the variable impedance material 48 is forced into the gap 40 using a syringe so that the material substantially completely fills gap 40. To ensure that the variable impedance material 48 contacts substantially the entire surface area of the gap edges of each conductor (i.e., edges 18 and 20 in FIG. 1), the gap 40 can be diced below the surface of the substrate wafer 30. For example, the gap can extend about 0.005 inches beyond the metallization into the substrate wafer 30.

Figure 3:
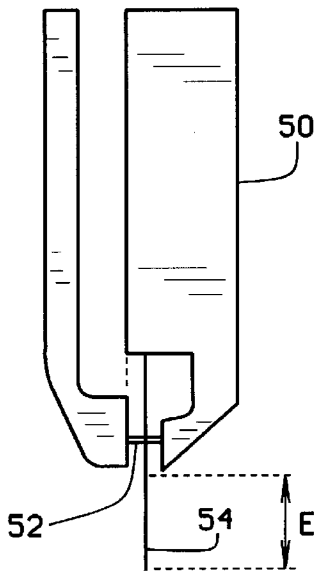
FIG. 3 illustrates a diamond dicing saw used to dice a gap between conductors according to the present invention.

Dicing is the preferred technique for forming the gap between the conductors into which the variable impedance material is introduced due to the precision with which the gap can thus be manufactured, amongst other reasons. Dicing involves applying a compressive force to a material such that it chips away to form an opening. Thus, in order to obtain a gap with sufficient precision in terms of width, depth and edge acuity, the parameters of the dicing operation should be carefully controlled. According to exemplary embodiments of the present invention, a diamond dicing saw is used as illustrated in FIG. 3.

The saw includes a saw hub 50 and a spindle 52 on which the saw blade 54 is rotatably mounted. Alternatively, a hubless saw can be used. The saw blade 54 can, for example be 1 mil thick and is, preferably, electroplated with a solution of nickel and diamond particles. The size of the diamond particles affects the size of the chips and, thus, the edge acuity. Accordingly, Applicants have found that the diamond particles should preferably be 5 microns or less. Other dicing parameters will also impact the precision of the gap. In particular, the exposure ("E" in FIG. 3) of the blade 54 beyond the hub 50 should be minimized to avoid blade wobble and associated inaccuracies in the gap width. Moreover, the feed speed of the substrate through the saw and the spindle speed of the blade should also be considered as will be appreciated by those skilled in the art.

While the foregoing exemplary embodiments have been described in terms of discrete transient voltage protection elements which can be incorporated directly into printed circuit boards, those skilled in the art will also appreciate that the present invention can be applied to any physical transient voltage protection device construction. For example, the manufacturing steps described previously for producing and dividing a plurality of discrete devices from a large wafer also can be used to produce a through-hole electrical protection device for use with any of a variety of electrical connectors, for example, an RJ-type (i.e., telephone) connector, a D-Sub connector (i.e., multiple pin computer cable connectors), etc. Such electrical protection devices will have substantially the same structural characteristics in all of the electrical connectors except for variations in the shape/size and circuit pattern as will be appreciated by those skilled in the art.

For each connector, the connector-related device will be used to permit at least one connector pin to pass through a through-hole in the device, at least one ground pin passing through at least one ground through-hole in the device, and the ground through-hole(s) in the device will be electrically isolated from the other through-hole(s) until an over-voltage condition is experienced. As an example of this type of embodiment of the present invention, therefore, only a protection device for an RJ-11 type connector will be described for illustrative purposes.

Figure 4A:
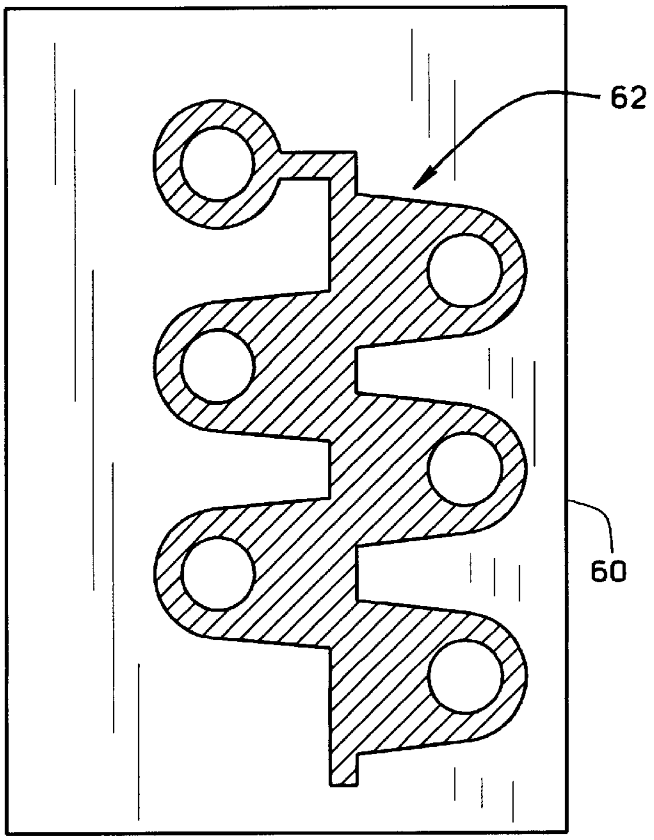
FIGS. 4A–4F illustrate a transient voltage protection device according to the present invention which is adapted to be attached to a connector.
Figure 4B:
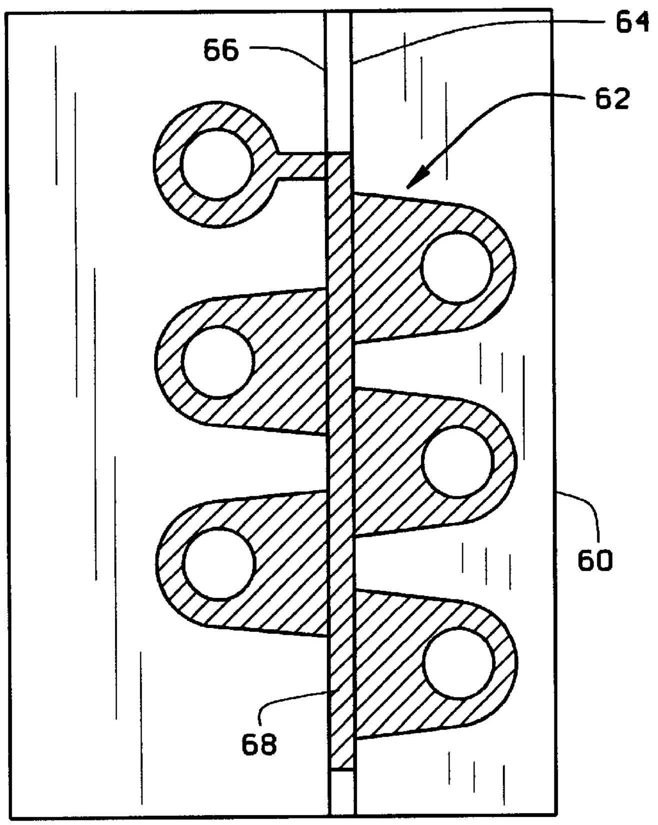
Figure 4C:
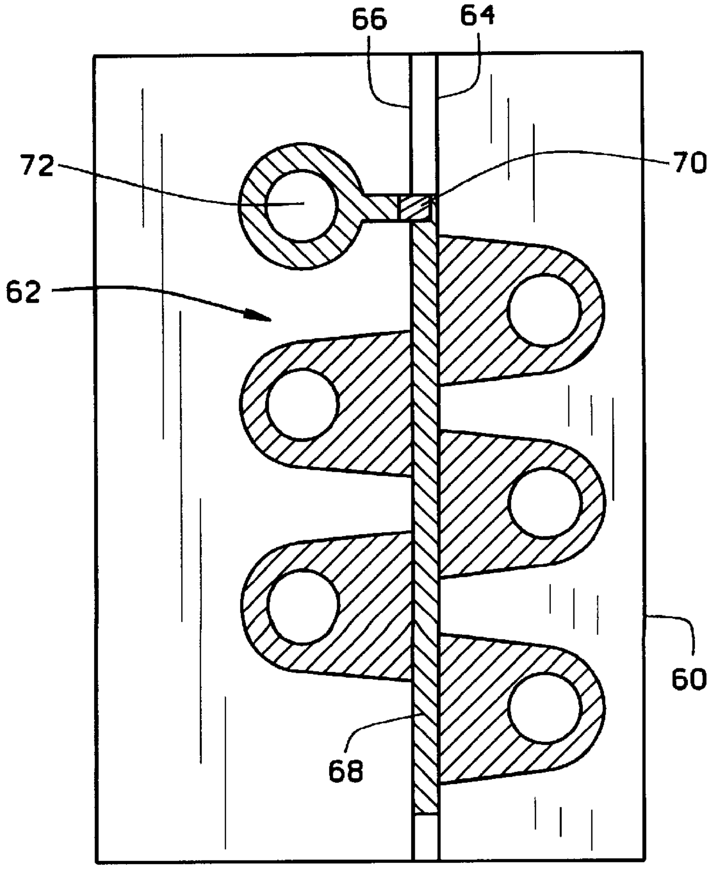
Figure 4D:
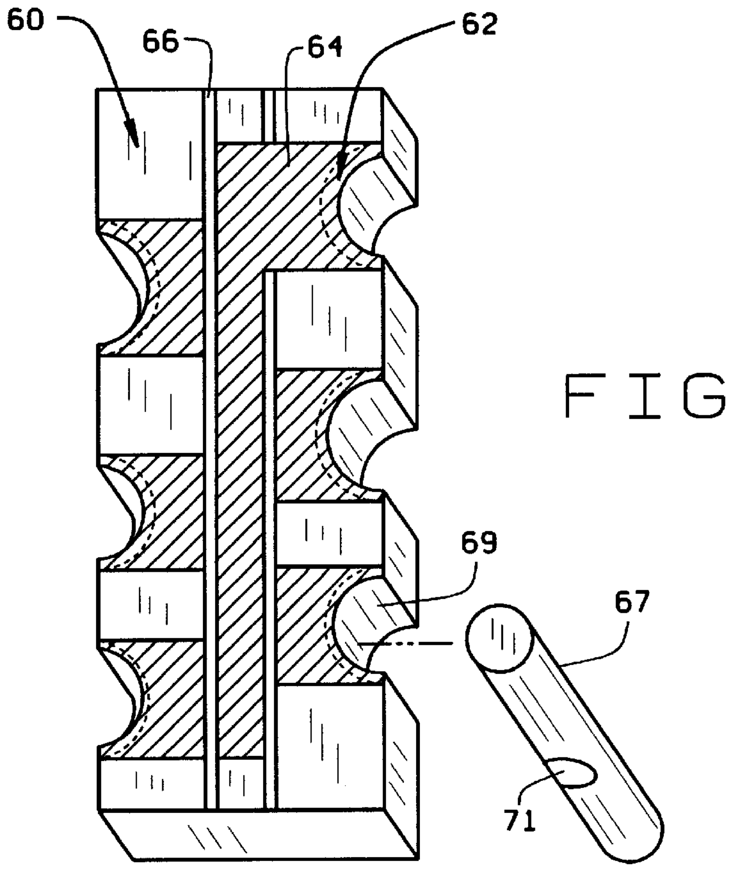

FIG. 4A depicts a transient voltage protection device for an RJ-11 type connector according to an exemplary embodiment of the present invention. Therein, a ceramic or glass-based substrate 60 has a metallization layer 62 screened thereon as described above. However, in this exemplary embodiment, the conductors are patterned to provide for through-holes which will mate with the pins of an RJ-11 type connector when the device is attached thereto. Next, as illustrated in FIG. 4B, two gaps 64 and 66 are diced through the substrate 60 and metallization layer 62. This has the affect of separating the six conductive portions surrounding the through-hole areas from a central conductive "bus" 68. Subsequently, as shown in FIG. 4C, a conductive material 70 is disposed between the conductor surrounding through-hole area (i.e,. the through-hole for the ground pin of the RJ-11 connector) and the conductive "bus" 68. This establishes conductive "bus" 68 as a grounded plane which is proximate each of the conductors associated with the other through-hole areas. An alternative embodiment is illustrated in FIG. 4D, wherein the pins, e.g., pin 67, mate with saddles, e.g., saddle 69, formed in the ceramic substrate 60. To provide a firm electrical and/or mechanical connection between the pins and the saddles, the pins can be soldered to the metallized surfaces of the saddles, as represented by solder patch 71.

In either embodiment, a variable impedance material 74 is deposited over the area including the gaps 62 and 64 and forced into the gap to provide an over-voltage and/or responsive electrical connection between the conductive "bus" 68 and each of the conductors 76–84, each of which will be associated with a corresponding pin of the RJ-11 connector to which the device is attached. Lastly, an encapsulating material 86 can be provided to cover the variable impedance material 74 to, for example, protect the variable impedance material and prevent electrical charges from other circuitry from being applied across the variable impedance material.

Figure 4E:
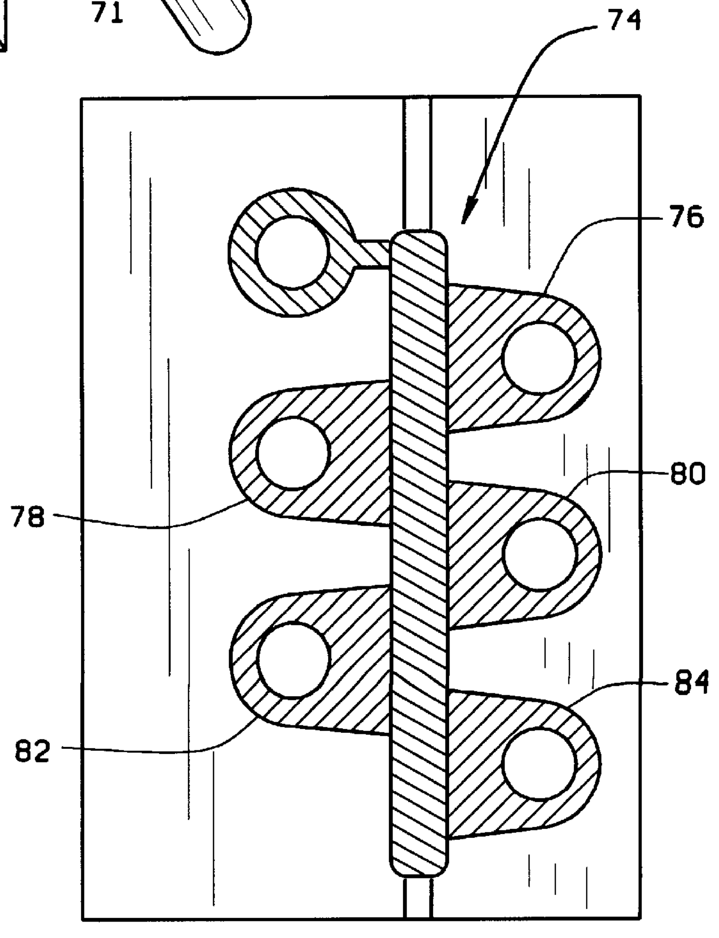
Figure 4F:
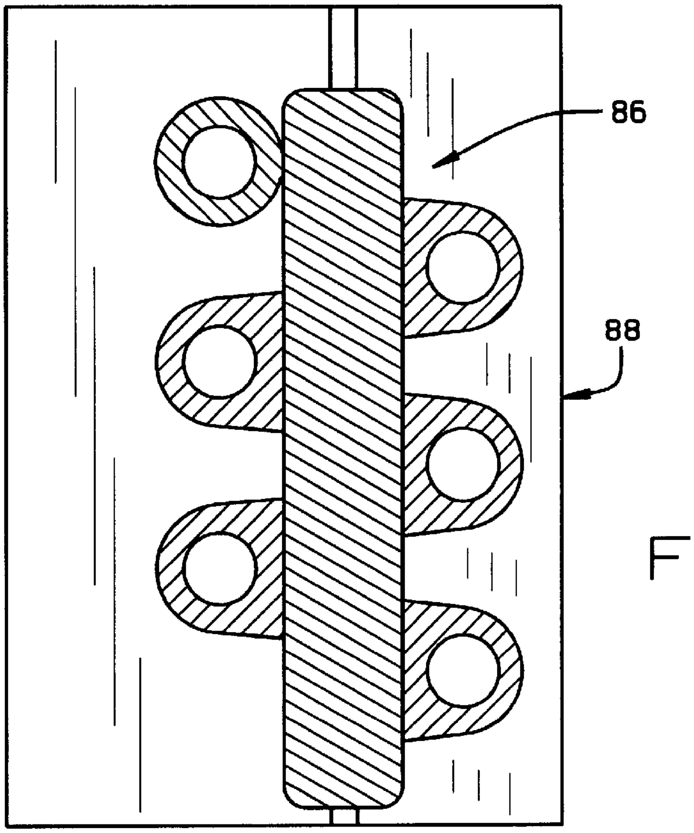

The through-holes can be made in the area 72 and within conductors 76–84 by drilling, laser micromachining or other methods recognized by those skilled in the art. The size of the through-holes will depend on the diameter of the leads extending from the particular connector. For example, the through-hole hole diameter can range from 20 mils to 40 mils, but more typically are 30 mils in diameter. The device 88 illustrated in FIG. 4E, as well as other exemplary embodiments wherein the transient voltage suppression device is intended to be used in connection with a connector having pins or leads, can then be mounted in mating relationship with the pins or leads and the substrate can be affixed to the connector body using solder or other adhering techniques.

Figure 5:
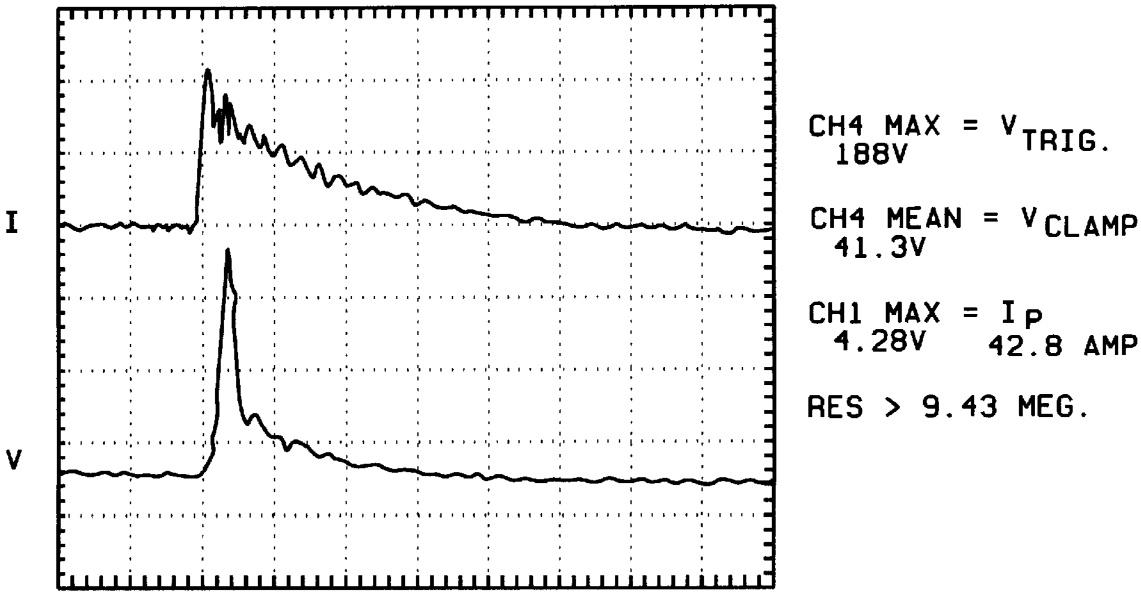
FIG. 5 illustrates a graph of current and voltage associated with a test of a device constructed in accordance with the present invention.

FIG. 5 is a graph of current through, and voltage across, a device constructed in accordance with the present invention as illustrated and described with respect to FIGS. 2A–2D. Therein, as an input, Applicants applied a 1000-4-2 standard 8 kV pulse as specified by the Electrotechnical Commission (IEC). This standard pulse is intended to simulate the pulse which would be applied to electrical circuitry by the discharge of static electricity associated with a human body. In the graphs, the upper waveform (I) represents the current conducted by the transient voltage suppression device, which flows into ground, while the lower waveform depicts the voltage across the device during the test.

In the particular test illustrated in FIG. 5, the device triggered (i.e., entered its on-state) at 188 V. The pulse was clamped at 41.3 V and peak current was 42.8 A. Thus, when compared with conventional transient voltage protection devices, devices constructed in accordance with the present invention can be seen from FIG. 5 to rapidly limit the transient voltage to a value which is substantially less than that of the prospective pulse value. Additionally, devices constructed in accordance with the present invention exhibit relatively low leakage current and low capacitance.

It is, of course, possible to embody the invention in specific forms other than those described above without departing from the spirit of the invention. The embodiments described above are merely illustrative and should not be considered restrictive in any way. For example, although the dicing of the gap was described above as being performed at the same time that the wafer cut into individual devices, the dicing of the gap could be performed at a later stage, i.e., each device could be individually gapped. Moreover, although the preceding exemplary embodiments focus on ceramic and glass-based substrates, dicing techniques could also be used to create gaps between conductors in other substrates such as resin materials (e.g., FR-4) etc.

Applicants have also discovered that the metallization which comprises the ground and signal conductors does not chip away in the same way as the ceramic substrate when contacted with the dicing saw to create the gap. Instead, the metal tends to bend away from the saw blade with the result that burr-like metal structures can be formed on one or both sides of the gap. Depending upon the subsequent handling of the devices, these burr-like metal structures may later deform to bridge the gap, thereby undesirably shorting the conductors. Thus, according to another exemplary embodiment of the present invention, Applicants have developed a technique to eliminate, or at least diminish, the formation of these burr-like structures.

Specifically, Applicants have found that by providing a coating or overlay on top of the metallization which comprises the conductors, the metal conductors properly chip away when the gap is diced therethrough. The overlay or coating, which can, for example comprise a tape (e.g., a fiberglass tape) or glass, holds the metallization in place and prevents the metal from simply bending or folding away from the dicing blade. In this way the dicing blade can properly dice the metal so that a clean and precise gap is formed without the afore-described burr-like structures.

Figure 6A:
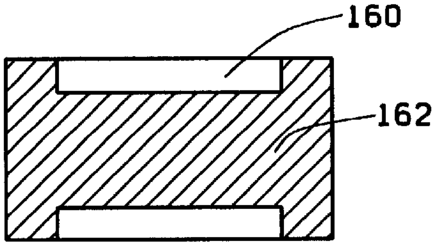
FIGS. 6A–6H illustrate a transient voltage protection device in various stages of manufacture according to another exemplary embodiment of the present invention.
Figure 6B:
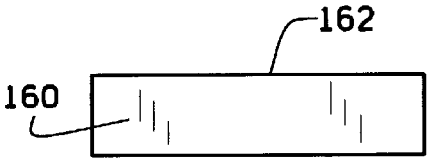
Figure 6C:
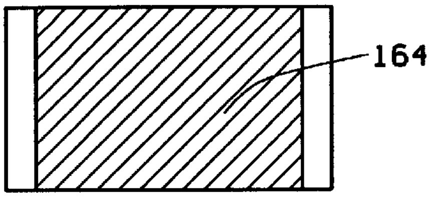
Figure 6D:
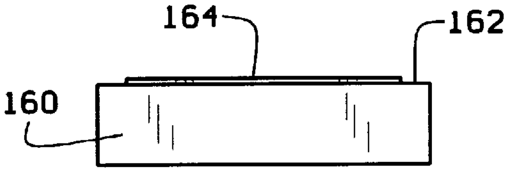

FIGS. 6A–6H depict a transient voltage protection device according to this exemplary embodiment of the present invention in various stages of manufacture. For example, FIGS. 6A and 6B depict top and side views, respectively, of the protection device after the conductor metallization layer 162 has been formed on the substrate 160, which can be ceramic as described above. FIGS. 6C and 6D depict the protection device at the stage where the coating or overlay 164 is applied on top of the metallization 162. In this exemplary embodiment, the coating or overlay 164 is a 2 mil thick layer of glass which has been screen-printed onto the metallization.

Figure 6E:
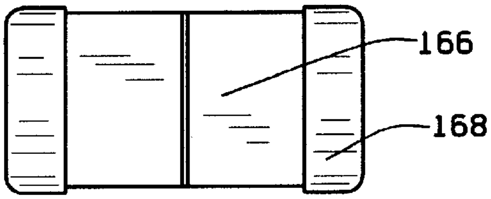
Figure 6F:
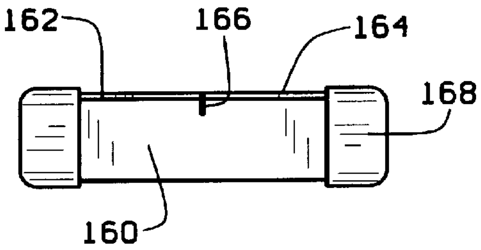
Figure 6G:
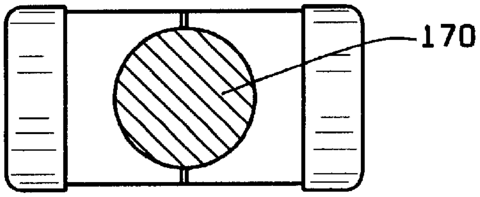
Figure 6H:
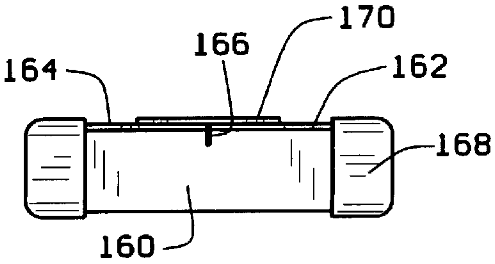

FIGS. 6E and 6F show the protection device after the gap 166 has been diced through the overlay or coating 164, the metallization 162 and into the substrate 160. Termination caps 168 have also been applied to either end of the protection device. FIGS. 6G and 6H show the stage wherein a variable impedance material 170 is applied to selectively bridge the gap 166 as described above. Although not depicted herein, an encapsulation layer can further be provided as described above.

The scope of the present invention is determined by the claims (to be added in the utility application), rather than the preceding description, and all variations and equivalents which fall within the scope of the claims are intended to be embraced therein.

What is claimed is:

1. A device comprising:

a first layer having a density of less than about 3.8 $gms/cm^3$ and having a gap formed therein;

a ground conductor and at least one other conductor formed on the first layer such that they are substantially co-planar and are separated from one another by said gap; and a variable impedance material disposed within the gap and in contact with both the ground conductor and the at least one other conductor.

2. The device of claim 1, wherein said first layer has a density of less than 3.5 $gms/cm^3$.

3. The device of claim 1, wherein said first layer has a density of less than 3.0 $gms/cm^3$.

4. The device of claim 1, wherein said first layer is formed from forsterite.

5. The device of claim 1, wherein said first layer is formed from calcium borosilicate.

6. The device of claim 1, further comprising:

a second layer formed on top of said ground conductor and at least one other conductor to prevent burring during formation of said gap.

7. The device of claim 1, wherein said second layer is formed from glass.

* * * * *